United States Patent Office 2,935,267
Patented May 3, 1960

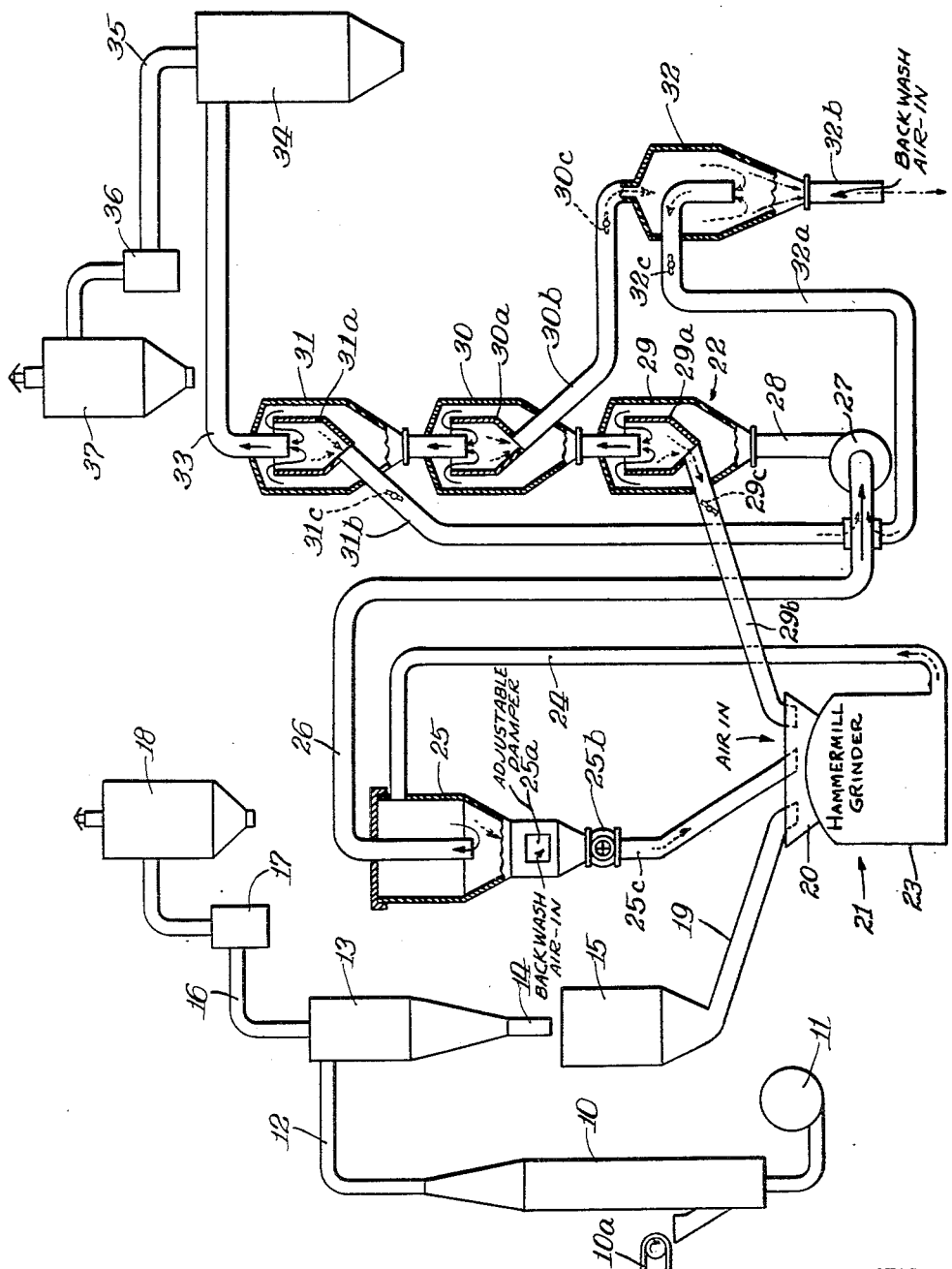

2,935,267

METHOD OF AND APPARATUS FOR CONTINUOUSLY PROCESSING EXPANDED PERLITE

Wilfred C. Maxey, Lake Zurich, Ill.

Application October 12, 1956, Serial No. 615,693

15 Claims. (Cl. 241—17)

This invention relates to a continuous process for producing perlite filter aids from expanded perlite, and to an apparatus for performing the method.

There has recently developed a considerable interest in the use of expanded and ground perlite as a filter aid for use as a substitute for diatomaceous earth. The use of perlite as a filter aid has developed rather slowly because of the difficulty in processing expanded and ground perlite to produce a uniform product which is free of foreign matter and oversize perlite particles.

Commercial filtration processes using a filter bed, or filter cake of finely divided material involve the pumping of material to be filtered through the filter bed. Foreign material as normally found in processed expanded perlite is generally highly abrasive, and when it works into the pumping system it causes excessive wear of pumps and pipes. Oversize perlite particles are generally those which have not been adequately ground, so that they still contain enough voids to float on the surface of a liquid to be filtered. The accumulation of floating particles gradually clogs the pipes in the system, and reduces the value of the perlite as a filter aid by eliminating the floating particles as a component of the filter bed or the filter cake.

The improved method of processing expanded perlite herein disclosed has, for the first time, resulted in satisfactory commercial production of a perlite filter aid from expanded perlite which is in all respects equal to diatomaceous earth from the point of view of flow rate and clarity. A filter aid produced from expanded perlite is inherently superior to diatomaceous earth because it has a lower bulk density. In spite of its inherent superiority, however, defects in previous processes or methods and apparatus resulted in an end product which was not commercially acceptable as a substitute for diatomaceous earth.

The principal object of the present invention, therefore, is to produce from expanded perlite a filter aid which is commercially competitive with diatomaceous earth so as to make available in commercial filtration processes a satisfactory material possessing the inherent superiority of perlite.

A further object of the invention is to provide a method for continuously processing expanded perlite from a grinding step to a commercially acceptable end product.

Another object of the invention is to provide a plant for perlite processing which has a relatively low initial cost and which may be operated economically.

A suitable plant for commercially practicing the process of the present invention is illustrated diagrammatically in the accompanying drawing.

The diagrammatic showing of the drawing illustrates a complete processing plant including the expander equipment, and consists of an expander 10 into which crude perlite ore is introduced by any suitable means such as a belt conveyor 10a, and the perlite is expanded in the expander 10 in a conventional manner by application of heat to raise the temperature to a point within the range from 1300° to 2000° F. The expanding temperature depends upon the characteristics of the particular crude ore being processed, and is determined by the appearance of the expanded material. The expander is provided with a blower 11, and the expanded material passes from the expander through an overhead outfeed pipe 12 to a cyclone type collector 13 of conventional design which is so arranged and operated that substantially all of the material which leaves the expander passes through the outfeed 14 at the bottom of the collector and into an expanded raw material storage hopper 15. Vapors produced in the expanding process, together with a very small amount of fine dust, are drawn out of the cyclone collector through a waste pipe 16 by a blower 17 which delivers them to a collecting point such as a bag house 18 where the fine dust may be gathered for ultimate disposal.

The components heretofore described are conventional in perlite processes, and it is the expanded product collected in the hopper 15 which provides the raw material for processing in accordance with the present invention.

The raw material collected in the hopper 15 consists largely of expanded perlite, but there is a small percentage of refuse such as sand and other non-perlite particles which are too heavy to have been drawn off to the bag house 18. This raw material consisting of expanded perlite and refuse is fed out of the hopper 15 in a continuous stream by a suitable conveyor 19 into an inlet compartment 20 of a processing system which may be stated broadly to have a primary side including a primary air duct system indicated generally at 21 and a secondary side including a secondary air duct system indicated generally at 22.

Just inside the inlet compartment 20 of the processing system is a hammer mill type grinder 23 through which the raw material stream is continuously passed in order to grind the expanded perlite in the stream; and the ground raw material is drawn out of the hammer mill 23 as an unclassified material stream containing ground perlite and refuse. This unclassified material stream is carried through a feed pipe 24 and into a backwash air classifier 25 where it is divided into a partially classified stream of material and a coarse stream of material. As indicated by the solid arrows in the drawing, the partially classified stream is drawn around a rather sharp corner into a classifier outfeed pipe 26 which connects the top of classifier 25 with the suction side of a blower 27. The material removed from the partially classified stream in the backwash air classifier 25 to form the coarse material stream is thrown out of the partially classified stream because it is too heavy to be drawn into the outlet pipe 26, and drops downwardly as indicated by the broken line arrow in the drawing through a secondary backwash air stream which is drawn into the primary classifier 25 through a secondary air inlet controlled by an adjustable damper 25a, as shown by the arrow marked "secondary air-in." This coarse material stream thus moves through a countercurrent of backwash air the velocity of which may be adjusted by controlling the damper so as to generally control the distribution of material as between the partially classified stream and the coarse stream. The coarse stream which goes entirely through the countercurrent of air passes through an air lock 25b and a return pipe 25c which feeds it back into the inlet compartment 20 of the system where it is commingled with the raw material from conveyor 19 for regrinding in the hammer mill 23.

The partially classified material which is drawn out of the backwash classifier 25 through the duct 26 in an airborne stream is carried through the blower 27 and into a secondary duct 28 which connects the pressure side of the blower with a secondary air classifier 29 which is the first of a series of classifiers on the secondary side 22 of the processing system. Connected in series with the secondary classifier 29 are two additional secondary classifiers 30 and 31 which are identical in structure and operation with the classifier 29, but which may be of different sizes. The secondary classifiers 29, 30 and 31 are provided, respectively, with upstanding annular baffles 29a, 30a, and 31a which cause said classifiers to operate generally on a centrifugal principle for separating or classifying the partially classified stream of material as it flows through each of the classifiers. In each case, a more highly classified material stream passes through the classifier as indicated by the solid arrows, while from the three classifiers a certain percentage of heavier material moves downwardly as indicated by the broken arrows in the drawing and enters a return duct which communicates with the suction side 21 of the processing system. As seen in the drawing, a return duct 29b for the secondary classifier 29 is connected to the primary side 21 of the system at the inlet compartment 20, while a return duct 30b for the secondary classifier 30 connects with a refuse trap 32 and then with the primary side 21 of the processing system immediately ahead of the blower 27. A return duct 31b for the secondary classifier 31 returns directly to the primary side 21 of the system immediately ahead of the blower 27. Return ducts 29b and 31b are provided with dampers 29c and 31c, respectively, which may be set to prevent excessive return of material through the return ducts. Thus the ducts may be of large capacity to reduce clogging.

The refuse trap 32 receives the stream of heavier rejected material from the secondary classifier 30 through the duct 30b in a downward flow as indicated by the broken line arrows in the drawing, and the stream of material, which includes both ground perlite of various sizes and refuse, is again divided into a return stream which is drawn upwardly into a refuse trap outgoing return duct 32a for return to the primary side 21 of the system. Material which is too heavy or dense to be drawn around the corner and into the outgoing return duct 32a passes downwardly as indicated by the dot-dash arrows in the drawing and passes out of the processing system through a refuse outlet 32b. The incoming return duct 30b and the outgoing return duct 32a are provided with dampers 30c and 32c, respectively, to control the flow of air through the trap 32, and more particularly the velocity of a secondary air stream which is drawn in through the refuse outlet 32b, as shown by the arrow marked "secondary air-in." The position of the dampers 30c and 32c may be adjusted to vary the velocity of the secondary air stream in accordance with the characteristics of the refuse which passes out through said secondary air stream. Thus, if the refuse contains too much usable ground perlite the velocity of the air stream may be increased somewhat by adjusting the dampers, while if the volume of refuse drops below an amount which could be expected to be present in the perlite material being processed the dampers may be adjusted to reduce the velocity of the incoming secondary air and permit a greater volume of material to pass out of the processing system through the refuse opening 32b. Generally speaking, the perlite particles which will be rejected in the secondary classifiers will be largely particles which have not been as fully ground, and these larger perlite particles are considerably less dense than the heavy particles of refuse such as sand. Thus, with any given velocity of secondary air entering the refuse trap 32, the probability is that the relatively dense refuse will pass through the secondary air stream while the less dense large perlite particles will be carried upwardly in the secondary air flow and through the outgoing return duct 32a.

Extending upwardly out of the secondary classifier 31 is a finished product duct 33 which connects with a cyclone collector 34 for the fully classified finished product emerging from the classifier 31. The cyclone collector 34 has a fine refuse discharge pipe 35 extending upwardly and into a blower 36 which feeds the fine refuse from the top of the collector 34 into a repository such as a bag house 37.

The finished, fully classified perlite in the cyclone collector 34 may be removed in any desired manner for shipping. The fine material which goes into the bag house 37 may also be removed periodically and disposed of.

It will be seen from the foregoing description of the processing apparatus and the method of handling the expanded perlite in accordance with the present invention that all the ground expanded perlite and refuse in the original raw material stream which enters through the inlet compartment 20 is subjected to a first backwash classification on the primary side 21 of the processing system, and that material which can pass out through the secondary air stream at the lower end of the backwash classifier 25 is returned for regrinding. Thus, certain particles may pass repeatedly through the grinder 23 before they get out of the primary side of the system. The stream of partially classified material which goes through blower 27 to the secondary side 22 of the system is subjected to a first classification in classifier 29 from which the rejected heavy material goes back for regrinding. Material which passes through the classifier 29 and is rejected at the classifier 30 is passed through the refuse trap 32 where unusable refuse is filtered out through the secondary air flow and the remaining rejected material from the classifier 30 is returned to the primary side of the system immediately ahead of the blower 27. Material which is rejected in the secondary classifier 31 returns directly to the primary side 21 immediately ahead of the blower 27. Thus, every bit of heavy material or oversize material is given several opportunities to be rejected in the classifier 29 as it comes back through the blower 27 and reenters that classifier. This means that there are repeated possibilities for having material returned for grinding. Similarly the recirculation of rejected material from the classifier 31 to the primary side of the system means that this material not only may return to the grinder but also may pass through the refuse trap 32.

Actually blower 27 inherently performs two functions in the apparatus and process. Since the airborne material passes through the rapidly rotating blower impeller, a certain amount of grinding of the material necessarily takes place in the blower. Since the blower is obviously a very inefficient grinder this may be considered as a light grinding, and is quite different from the grinding which takes place in the hammer mill. Nevertheless, it still affords some size reduction, and thus aids in the process.

The net result of continuously returning rejected material from all three of the secondary classifiers to the primary side 21 of the system and back through blower 27 is to leave very little opportunity for oversize particles or for non-perlite refuse to find its way into the finished product stream entering the cyclone collector 34.

The foregoing detailed description is given for clearness of understanding only and no unnecessary limitations are to be understood therefrom, as modifications will be obvious to those skilled in the art.

I claim:

1. A method of continuously processing expanded perlite, comprising: forming a raw material stream containing expanded perlite and refuse; grinding the raw material stream to provide an unclassified material stream containing ground perlite and refuse; suspending said unclassified stream in a moving air current to provide an airborne unclassified stream; continuously air classifying said unclassified stream to provide a partially classified airborne stream and a heavy coarse stream; returning said heavy stream for regrinding; lightly grinding said partially classified airborne stream; continuously passing said partially classified lightly ground airborne stream through a series of air classification steps in each of which a heavier portion of the stream is separated from the balance of the stream; returning the heavier portion of the stream from the first step in said series for regrinding; lightly grinding the heavier portion of the stream from each later step in said series and then returning it to repeat said first step; and collecting the balance of the stream from the last step in said series as a finished product.

2. The method of claim 1 which includes a series of at least three air classification steps, and in which the heavier fraction of the srteam from the second step in said series is subjected to a controlled countercurrent air classification in which refuse is removed from said heavier portion, the balance of said heavier portion being returned to repeat the first of said series of steps.

3. The method of claim 1 which includes a series of at least three air classification steps, and in which the heavier fraction of the stream from a step in said series after the first step is subjected to an air classification in which refuse is removed from said heavier portion, the balance of said heavier portion being returned for light grinding and to repeat the first of said series of steps.

4. A method of continuously processing expanded perlite, comprising: forming a raw material stream containing expanded perlite and refuse; grinding the raw material stream to provide an unclassified material stream containing ground perlite and refuse; suspending said unclassified stream in a moving air current to provide an airborne unclassified stream; continuously air classifying said unclassified stream to provide a partially classified airborne stream and a heavy coarse stream; returning said heavy stream for regrinding; continuously passing said partially classified airborne stream through a series of air classification steps in each of which a heavier portion of the stream is separated from the balance of the stream; returning the heavier portion of the stream from the first step in said series for regrinding; subjecting the heavier portion of the stream from a later step in said series to an air classification in which refuse is removed from said heavier portion; returning the balance of said heavier portion which remains after said air classification to repeat the first of said series of steps; and collecting the balance of the stream from the last step in said series as a finished product.

5. The method of claim 4 in which the heavier portion of the stream from the first step in said series is returned directly for regrinding without intermediate processing.

6. The method of claim 4 which includes a series of at least three air classification steps, and in which the air classification to remove refuse is a controlled, countercurrent classification performed upon the heavier portion of the stream from the second step in said series.

7. Apparatus for continuously processing a stream of raw material which includes expanded perlite and refuse, comprising: a primary air duct system including air inlet means; a grinder in said primary air duct system through which air from said inlet means passes; means for feeding raw material into the grinder so that an airborne stream of ground material leaves the grinder; a primary air classifier in said primary air duct system to receive ground material and classify it into a coarse material stream and an airborne stream; return means for feeding the coarse material stream from said primary classifier into the grinder; a blower; a connecting duct in said primary system joining said primary classifier to the suction side of the blower for causing air to enter said primary duct system through the air inlet means to carry said ground material in suspension, and for removing the airborne stream from said primary classifier; a series of secondary air classifiers, each of said classifiers being adapted to classify an airborne stream of ground material into a lighter portion and a heavier portion; a secondary duct connecting the first of said series of secondary classifiers to the pressure side of the blower; duct means for moving the lighter portion from each secondary classifier into the next classifier in the series; return duct means connecting said series of secondary air classifiers to the primary air duct system for returning the heavier portion from each of said series, said return duct means including a refuse duct from a second classifier in said series, a counter-air current refuse trap with which said refuse duct communicates; a refuse outlet at the lower end of said refuse trap which provides a secondary air inlet; and a duct to return air and a lighter portion of material from said refuse trap to the primary air duct system between the grinder and the blower; a collecting device; and a finished product duct connecting said collecting device with the secondary air classifier which is most remote from the blower to receive the lighter portion therefrom.

8. The apparatus of claim 7 in which the return duct means also includes a duct from the first of said series of air classifiers which feeds the heavier portion from the first of said series into the grinder.

9. Apparatus for continuously processing a stream of raw material which includes expanded perlite and refuse, comprising: an air duct system including air inlet means; blower means for circulating air through said duct system, said blower means having an inlet and an outlet; a grinder in the air duct system through which air from said inlet means passes; means for feeding raw material into the grinder so that an airborne stream of ground material leaves the grinder; a primary air classifier in the duct system to receive said airborne stream, said primary classifier having an upper outlet for a partially classified airborne stream and a lower outlet for a coarse material stream; means for feeding material from said lower outlet into the grinder; a connecting duct joining said upper outlet with the blower inlet; a plurality of air classifiers connected with the blower outlet in series, each of said classifiers being adapted to classify an airborne stream of ground material into a lighter portion and a heavier portion; return duct means from the lower end of the first classifier in said series to feed the heavier portion into the grinder; duct means connecting the top of each classifier in the series with the next classifier; return duct means from the lower portion of each classifier in the series after the first, said last named return duct means joining said duct system adjacent the blower inlet and between said grinder and said first classifier in said series; a collecting device; and a finished product duct connecting the last classifier in said series with said collecting device.

10. The apparatus of claim 9 in which the return duct means from each classifier except the first in the series joints the duct system between the primary air classifier and the first classifier in said series.

11. Apparatus for continuously processing a stream of raw material which includes expanded perlite and refuse, comprising: an air duct system having an air inlet; blower means for circulating air through said duct system, said blower means having an inlet and an outlet; a grinder in the air duct system through which air from said inlet means passes; means for feeding raw material into the grinder so that an airborne stream of ground material leaves the grinder; a primary air classifier in the duct system to receive said airborne stream, said primary classifier having an upper outlet for a partially classified airborne stream and a lower outlet for a coarse material stream; means for feeding material from said lower outlet into the grinder; a connecting duct joining said upper outlet with the inlet of the blower means; a plurality of air classifiers connected with the outlet of the blower means in series, each of said classifiers being adapted to classify an airborne stream of ground material into a lighter portion and a heavier portion; return duct means from the lower portion of the first classifier in said series to feed the heavier portion into the grinder;

a duct connecting the top of said first classifier in said series with a second classifier in the series; a countercurrent air flow refuse trap; a duct connecting said second classifier in the series with said countercurrent air flow refuse trap to feed the heavier portion of material from said second classifier into said refuse trap; a duct connecting said refuse trap to the duct system adjacent the blower inlet and between said grinder and said first classifier in said series to carry air and fine material from the trap into the blower for recirculation through the first classifier in said series; duct means connecting the top of said second classifier with a third classifier in said series; a return duct from said third classifier in the series connecting said third classifier to the duct system adjacent the blower inlet and between said grinder and said first classifier in said series to return a heavier portion from said classifier to the blower for recirculation through the first classifier in the series; a collecting device; and a finished product duct connecting said third classifier with said collecting device.

12. Apparatus for continuously processing a stream of raw material which includes expanded perlite and refuse, comprising: a primary air duct system including air inlet means; a grinder in said primary air duct system through which air from said inlet means passes; means for feeding raw material to the grinder so that an airborne stream of ground material leaves the grinder; a primary air classifier in said primary air duct system to receive ground material and classify it into a coarse material stream and an airborne stream; return means for feeding the coarse material stream from said primary classifier into the grinder; a blower; a connecting duct in said primary system joining said primary classifier to the suction side of the blower for causing air to enter said primary duct system through the air inlet means to carry said ground material in suspension, and for removing the airborne stream from said primary classifier; a series of secondary air classifiers, each of said classifiers being adapted to classify an airborne stream of ground material into a lighter portion and a heavier portion; a secondary duct connecting the first said series of secondary classifiers to the pressure side of the blower; duct means for moving the lighter portion from each secondary classifier into the next classifier in the series; a return duct connecting the first classifier in said series to the primary air duct system ahead of the primary air classifier so as to return the heavier portion of material from said classifier to the grinder; return duct means connecting each secondary air classifier after said first classifier to the primary air duct system adjacent the blower inlet and between the grinder and the blower so the heavier portion of material from each such classifier is returned by the blower to the secondary system; a collecting device; and a finished product duct connecting said collecting device with the secondary classifier which is most remote from the blower to receive the lighter portion therefrom.

13. Apparatus for continuously processing a stream of raw material which includes expanded perlite and refuse, comprising: an air duct system including air inlet means; a grinder in said duct system through which air from said inlet means passes; means for feeding raw material to the grinder so that an airborne stream of ground material leaves the grinder; blower means for circulating said airborne stream through the duct system, said blower means including inlet means and outlet means; a plurality of air classifiers in said air duct system in series, so that each classifier receives the lighter portion of the airborne stream from the next preceding classifier; duct means for returning the heavier portion from the first two classifiers to the air duct system for regrinding; a refuse trap through which the heavier portion from a later one of said plurality of classifiers passes; a return duct from the refuse trap to the air duct system adjacent the blower inlet and between the grinder and the blower; a collecting device; and a finished product duct connecting the last of said plurality of classifiers with said collecting device.

14. Apparatus for continuously processing a stream of raw material which includes expanded perlite and refuse, comprising: a primary air duct system including air inlet means; a grinder in said primary air duct system through which air from said inlet means passes; means for feeding raw material to said grinder so that an airborne stream of ground material leaves the grinder; a primary air classifier in said primary air duct system to receive ground material and classify it into a coarse material stream and an airborne stream; return means for feeding the coarse material stream from said primary classifier into the grinder; a blower; a connecting duct in said primary system joining said primary classifier to the suction side of the blower for causing air to enter said primary duct system through the air inlet means to carry said ground material in suspension, and for removing the airborne stream from said primary classifier; a series of secondary air classifiers, each of said classifiers being adapted to classify an airborne stream of ground material into a lighter portion and a heavier portion; a secondary duct connecting the first said series of secondary classifiers to the pressure side of the blower; duct means for moving the lighter portion from each secondary classifier into the next classifier in the series; return duct means connecting said series of secondary air classifiers to the primary air duct system for returning the heavier portion from each of said series, said return duct means including a refuse duct from a classifier after the first in said series, an air refuse trap with which said refuse duct communicates, said trap having a refuse outlet through which refuse leaves the system, and a duct to return air and a lighter portion of material from said refuse trap to the primary air duct system between the grinder and the blower; a collecting device; and a finished product duct connecting said collecting device with the secondary air classifier which is most remote from the blower to receive the lighter portion therefrom.

15. Apparatus for continuously processing a stream of raw material which includes expaned perlite and refuse, comprising: a primary air duct system including air inlet means; a grinder in said primary air duct system through which air from said inlet means passes; means for feeding raw material to said grinder so that an airborne stream of ground material leaves the grinder; a primary air classifier in said primary air duct system to receive ground material and classify it into a coarse material stream and an airborne stream; return means for feeding the coarse material stream from said primary classifier into the grinder; a blower; a connecting duct in said primary system joining said primary classifier to the suction side of the blower for causing air to enter said primary duct system through the air inlet means to carry said ground material in suspension, and for removing the airborne stream from said primary classifier; a series of secondary air classifiers, each of said classifiers being adapted to classify an airborne stream of ground material into a lighter portion and a heavier portion; a secondary duct connecting the first of said series of secondary classifiers to the pressure side of the blower; duct means for moving the lighter portion from each secondary classifier into the next classifier in the series; return duct means connecting said series of secondary air classifiers to the primary air duct system for returning the heavier portion from each of said series, said return duct means including ducts connecting each classifier after the first in the series to the connecting duct between the primary classifier and the blower; a collecting device; and a finished product duct connecting said collecting device with the secondary air classifier which is most remote from the blower to receive the lighter portion therefrom.

(References on following page)

References Cited in the file of this patent

UNITED STATES PATENTS

| | | |
|---|---|---|
| 657,998 | Williams | Sept. 18, 1900 |
| 1,619,295 | Gardner | Mar. 1, 1927 |
| 1,897,144 | Prouty | Feb. 14, 1933 |
| 2,068,599 | Ehrsam | Jan. 19, 1937 |
| 2,200,822 | Crites | May 14, 1940 |
| 2,236,548 | Prouty | Apr. 1, 1941 |
| 2,313,956 | McGrane | Mar. 16, 1943 |
| 2,474,314 | Koehne | June 28, 1949 |
| 2,668,667 | Fern | Feb. 9, 1954 |